United States Patent [19]
Beck

[11] 3,728,350
[45] Apr. 17, 1973

[54] 1-(2-CARBOXYPHENYL)-5,7-DIMETHOXY-3,4-DIHYDROCARBOSTYRIL INTERMEDIATES FOR ACRONYCIS

[75] Inventor: James R. Beck, Indianapolis, Ind.

[73] Assignee: Eli Lilly and Company, Indianapolis, Ind.

[22] Filed: July 6, 1971

[21] Appl. No.: 128,527

Related U.S. Application Data

[62] Division of Ser. No. 653,667, July 17, 1967, Pat. No. 3,624,087.

[52] U.S. Cl. ................................................260/287 R
[51] Int. Cl. ..............................................C07d 33/00
[58] Field of Search ...................................260/287 R

[56] References Cited

UNITED STATES PATENTS 3,117,959    1/1964    Dehnert..........................260/287 R

OTHER PUBLICATIONS

Beck et al. Jour. Am. Chem. Soc. Vol. 89, p. 3934 (1967)

*Primary Examiner*—Donald G. Daus
*Attorney*—Everet F. Smith et al.

[57] ABSTRACT

The total synthesis of acronycine and related compounds with readily available 1-(2-carboxyphenyl)-5,7-dialkoxy-3,4-dihydrocarbostyrils is described, as are various classes of other intermediates useful in the synthesis.

1 Claim, No Drawings

1-(2-CABOXYPHENYL)-5,7-DIMETHOXY-3,4-DIHYDROCARBOSTYRIL INTERMEDIATES FOR ACRONYCIS

CROSS-REFERENCE TO RELATED APPLICATION

This application is a division of co-pending application, Ser. No. 653,667, filed July 17, 1967 now U.S. Pat. No. 3,624,087.

BACKGROUND OF THE INVENTION

Acronycine was first isolated from *Acronychia baueri* by Lahey and co-workers [Nature 162, 223 (1948) and *Aust. J. Sci. Res.* 2A, 423 (1949)]. The chemistry of acronycine was discussed in further articles by Lahey and co-workers [*Aust. J. Sci. Res.* 2A, 622, 630 (1949)]1966 it was determined by MacDonald and Robertson, *Aust. J. Chem.* 19, 275 (1966) and by Covindachari, Pai and Subramaniam, *Tetrahedron* 22, 3245 (1966) that acronycine had the following structure: O OCH₃

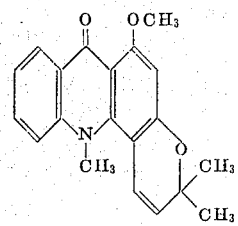

In addition, Govindachari et al. isolated the related compounds, noracronycine, des-N-methylacronycine and des-N-methyl-noracronycine, from the root bark of *Glycosmis pentaphylla*. Finally, the synthesis of acronycine from noracronycine was described in *Aust. J. Scl. Res.* 2A, 622 (1949).

Recently, it was found by Svoboda and co-workers [J. Pharm. Sci. 55, 758 (1966) and Lloydia 29, 206 (1966)]that acronycine had an extremely powerful anti-tumor action against transplanted tumors in mice, particularly against *Shionogl carcinoma*, C-1498 *myelogenous leukemia, Mecca lymphosarcoma* and X-5563 plasma cell myeloma.

SUMMARY

This invention provides a method of synthesizing acronycine which comprises first cyclizing N-(β-halopropionyl)-3,5-di-lower-alkoxyaniline to yield a 5,7-di-lower-alkoxy-3,4-dihydrocarbostyril, reaction of which with an o-halobenzoic acid under Ullman conditions yields a 1-(2-carboxyphenyl)-5,7-di-lower-alkoxy-3,4-dihydrocarbostyril. Treatment of the latter compound with a condensing agent such as polyphosphoric acid yields a mixture of a 3-(1,3-dialkoxy-9-oxo-4-acridanyl) propionic acid and the corresponding inner lactam. Esterification of this mixture with an alkanol yields a lower alkyl 3-(1,3-dialkoxy-9-oxo-4-acridanyl)propionate. This latter compound is next selectively dealkylated to give a lower alkyl 3-(1-hydroxy-3-lower-alkoxy-9-oxo-4-acridanyl)propionate, alkylation of which with an alkyl lithium or lower-alkyl Grignard reagent yields a 1-hydroxy-3-lower-alkoxy-4-(3-hydroxy-3,3-di-lower-alkylpropyl)-9-oxoacridane. Treatment of this latter compound with acid yields a 6-hydroxy-3,3-di-lower-alkyl-2,3-dihydro-7(12H)1H-phrano-[2,3-ce]acridanone.

In the above reaction when there is no substituent present in the o-halobenzoic acid and where the alkylating agent is methyllithium or methylmagnesium bromide, the resulting compound is N-desmethylnor-dihydroacronycine. N-methylation of N-desmethylnor-dihydroacronycine followed by selective dehydrogenation using dichlorodicyanoquinone (DDQ) yields noracronycine directly. O-alkylation of noracronycine yields acronycine. The above synthesis can be visualized in Reaction Scheme I which follows:

REACTION SCHEME I

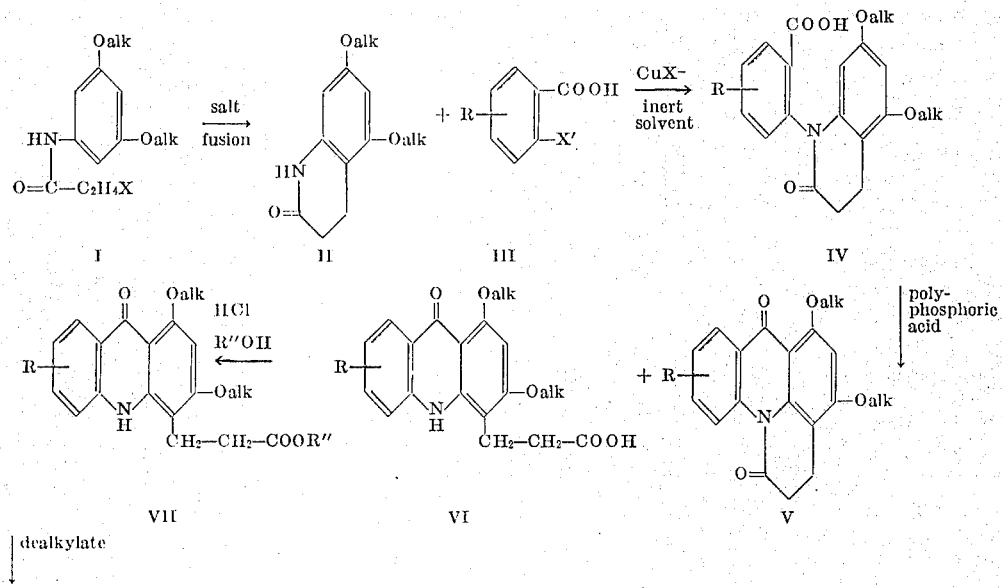

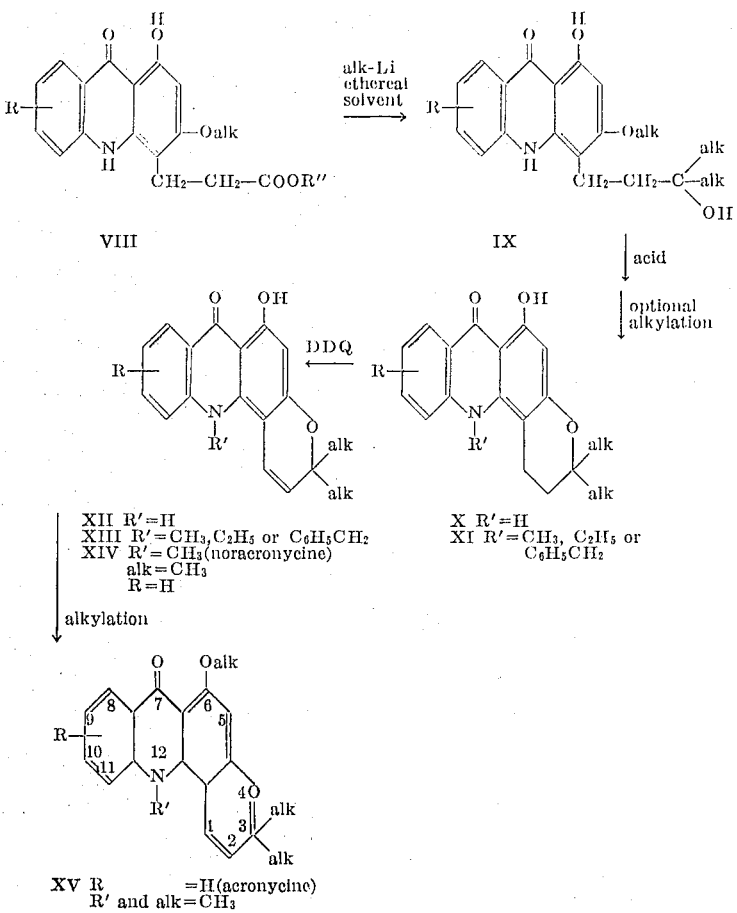

XII R′=H
XIII R′=CH₃, C₂H₅ or C₆H₅CH₂
XIV R′=CH₃ (noracronycine)
  alk=CH₃
  R=H X R′=H
XI R′=CH₃, C₂H₅ or C₆H₅CH₂

XV R =H (acronycine)
  R′ and alk=CH₃

In the above reaction scheme, X and X′ can be chlorine, bromine or iodine and alk is a lower-alkyl group having from 1 to 4 carbon atoms, either straight chained or branched chained, for example, methyl, ethyl, n-propyl, isopropyl, n-butyl, iso-butyl and the like: R can be hydrogen, halogen, nitro, trifluoromethyl, alk, or Oalk; R′ is hydrogen, methyl, ethyl, benzyl; and R″ is methyl or ethyl.

As previously mentioned, the first step of our novel multi-step synthesis of acronycine involves the cyclization of an N-(β-halopropionyl)-3,5-di-lower-alkoxyaniline (I) to a 5,7-di-lower-alkoxy-3,4-dihydrocarbostyril (II). The cyclization is carried out by the fusion of (I) with a mild, essentially anhydrous, Friedel-Crafts catalyst such as zinc chloride, zinc bromide, stannous chloride, antimony trichloride and the like, optionally in the presence of an alkali metal halide. The fusion of (I) in the presence of one of the aforementioned heavy metal catalysts is carried out at a temperature of about 50°C. to about 250°C., no solvent being required. In carrying out the cyclization of (I), we prefer to use zinc chloride in a relatively anhydrous state in combination with an alkali metal halide, such as sodium chloride, at a temperature of about 150°C. although higher or lower temperatures are fully operative. Addition of two parts of sodium chloride to one part of the zinc salt has an advantageous effect on the yield of (II).

In the second step, the 3,4-dihydrocarbostyril (II) is reacted with an o-halobenzoic acid (III) in the presence of cuprous iodide or other cuprous salt to yield the 1-(2-carboxyphenyl)-3,4-dihydrocarbostyril (IV). The reaction conditions are typically those used in the Ullmann reaction. The reaction is carried out in an inert solvent, such as nitrobenzene, in the presence of a hydrogen halide acceptor, such as, potassium carbonate, sodium carbonate and the like at a temperature of about 100°C. to about 250°C. We prefer to carry out the reaction of (II) with (III) where X′ is iodo in the presence of cuprous iodide in nitrobenzene at a temperature of about 150°C. for 24 hours.

The 1-(2-carboxyphenyl)-3,4-dihydrocarbostyril (IV) produced in the above reaction is then cyclized by treatment with polyphosphoric acid or other equivalent condensing agent at a temperature of about 50°C. to about 150°C. to yield a mixture consisting of a 1,3-di-lower-alkoxy-9-oxo-4-acridanylpropionic acid (VI) and the corresponding inner lactam, 2,3-dihydro-4,6-di-lower-alkoxy-1H,7H-pyrido-[3,2,1-de]acridine-1,7-dione (V) where alk and R are as defined above. This cyclization is preferably carried out at a temperature of about 90°C., though higher or lower reaction temperatures are fully operative.

The mixture comprising (V) and (VI) is next treated with 1 N methanolic or ethanolic hydrogen chloride at reflux temperature to yield the optionally substituted methyl or ethyl 9-oxo-4-acridanyl-propionate (VII), where R, R″ and alk are as defined above. During this reaction, the 2,3-dihydro-4,6-di-lower-alkoxy-1H,7H-pyrido-[3,2,1-de]acridine-1,7-dione (V) component of the above mixture is converted to (VII) by an alcoholysis reaction, and the acridanyl-propionic acid (VI)

component of the mixture is concurrently converted to (VII) by esterification. Thus, the separation of the mixture of (V) and (VI) is obviated by this one step methanolysisesterification reaction.

The 9-oxo-4-acridanylpropionate (VII) is then selectively dealkylated to yield a 1-hydroxy-3-methoxy-9-oxo-4-acridanyl-propionate (VIII), based on the procedure of F. M. Dean et al., *Tetrahedron Letters*, 4153-4159 (1966), which procedure utilizes boron trichloride in an inert solvent as the dealkylating agent. Alternatively, this selective dealkylation of the 1-alkoxy group of (VII) to obtain (VIII) has been carried out with a Grignard reagent in an ether-pyridine solvent system at a temperature of about 60°C. In this alternate procedure, the preferred Grignard reagent, selected from among the lower alkylmagnesium bromides or iodides—for example methylmagnesium iodide in ether—is first mixed with pyridine. Next a pyridine solution of (VII) is added. The reaction mixture is then heated for about 4 hours at a temperature of about 60°C. to yield (VIII). We prefer, however, to carry out the selective demethylation of (VII) by the aforementioned procedure based upon that of F. M. Dean et al., loc. cit. According to this procedure, (VII) is dissolved in methylene chloride and the solution treated with excess gaseous boron trichloride at a temperature of about 0°C. The reaction is carried to completion by allowing the mixture to remain at ambient temperature for 30 minutes. Excellent yields of the 1-hydroxy-3-alkoxy-9-oxo-4-acridanylpropionate (VIII) are thus obtained.

The monohydroxy compound (VIII) is next reacted with a lower alkyllithium where lower alkyl is the same as defined above, in an ethereal solvent such as diethyl ether, tetrahydrofuran or diethylene glycol dimethyl ether, to yield a tertiary carbinol (IX). In this reaction, the alkyllithium converts the propionate ester group to a tertiary alcohol. The reaction is carried out at a temperature in the range −70°C. to 0°C. in an inert atmosphere of a gas such as nitrogen. We prefer to carry out the preparation of (IX) in the solvent tetrahydrofuran at a temperature of about −20°C. with a reaction time of about 30 minutes to obtain maximal yields of the tertiary carbinol.

Upon treatment of the tertiary carbinol (IX) with 48 percent hydrobromic acid in glacial acetic acid at or near reflux temperature cyclization occurs involving the 3-alkoxy substituent and the tertiary hydroxyl group of (IX) to yield the 3,3-di-lower-alkyl-2,3-dihydro-7(12H)-1H-pyrano[2,3-c]acridinone (X). Preferably, however, the above cyclization is carried out by fusing (IX) with pyridine hydrochloride at a temperature of about 200°C. The reaction is usually complete after about four hours. (X) is obtained in a purified state by column chromatography over silica gel or similar material in a benzene-ethyl acetate solvent combination. Alternatively, we find it advantageous in carrying out our synthesis to convert (X) in the crude state to the more easily isolatable (XI) by the N-alkylation of (X) with a methyl halide, an ethyl halide or a benzyl halide in refluxing acetone in the presence of potassium carbonate. The above cyclization reaction whereby an alkoxy group undergoes cleavage, followed by intramolecular cyclization with a tertiary carbinol, is unique and indeed is a key step in the total synthesis of acronycine and related compounds. The product of the above alkylation (X) where R' is H is classified as a N-desmethylnordihydroacronycine but when R' is other than hydrogen, the compound is classified as a dihydronoracronycine. Treatment of either the normal or the N-desmethyl derivative with a quinone having a high standard oxidation potential (E°), preferably in the neighborhood of 1.0 volt in an inert solvent, yields a 6-hydroxy-3,3-di-lower-alkyl-1,2-dihydro-pyrano-[2,3-ce]acridinone (XIII). We prefer to carry out this dehydrogenation with 2,3-dichloro-5,6-dicyanobenzoquinone (DDQ) in refluxing toluene over a 1-3 hour period. This unique method for the introduction of the carbon to carbon double bond in the dihydropyranyl ring of (X) or (XI) affords surprisingly high yields.

In carrying out the series of reactions depicted in Reaction Scheme I, where R is H, R' and alk are methyl, dihydronoracronycine was obtained (XI). Oxidation of dihydronoracronycine with DDQ as described above afforded noracronycine identical in physical and chemical properties to the natural noracronycine reported by R. D. Brown, L. J. Drummond, F. N. Lahey and W. C. Thomas, *Australian J. Sci. Research* A2, 423 (1949). Methylation of noracronycine by the method of R. D. Borwn et. al., loc. cit. yielded acronycine.

The above synthetic procedure when carried out with compounds in which alk and R' are methyl and R is hydrogen yields acronycine which, as has been previously stated, has been found to be extremely useful in the treatment of experimental tumors in mice and is a potential addition to the armamentarium of antineoplastic drugs. The process of this invention is also useful for preparing compounds related to acronycine in which alk, R and R' are other than as specified as acronycine. These compounds, as well as compounds related to noracronycine [(XIII) where R' is other than hydrogen and alk is methyl] have an effect on the central nervous system which is generally a stimulating action, although certain of the compounds have sedative effects. Compounds corresponding to formulas II, IV, V, VI, VII, VIII, IX and X all represent novel structures and are all useful as intermediates for the preparation of acronycine and related compounds as represented by XV.

Further aspects and equivalents of the present invention will become obvious to one skilled in the art. The following examples further define the present invention but are not intended in any way to limit the scope of the invention.

EXAMPLE 1

5,7-Dimethoxy-3,4-dihydrocarbostyril

One hundred and thirty grams of 3,5-dimethoxy-N-(β-bromo-propionyl) aniline and 75 g. of zinc chloride (previously dried for 2 hours at 150°C.) were fused at 150°C. for 30 minutes. The reaction mixture was allowed to cool to room temperature and the 5,7-dimethoxy-3,4-dihydrocarbostyril formed in the above reaction was extracted therefrom with 400 ml. of ethyl acetate. The extract was washed successively with 400 ml. of 3 N hydrochloric acid, with a saturated solution of sodium bicarbonate and with a saturated solution of sodium chloride. The extract was separated and dried, and the solvent removed therefrom to yield 17 g. of 5,7-dimethoxy-3,4-dihydrocarbostyril melting at about 192°–194°C. after recrystallization from methyl alcohol.

Analysis-Calculated: C, 63.75; H, 6.32; N, 6.76
Found: C, 63.83; H, 6.64; N, 6.76

EXAMPLE 2

5,7-Dimethoxy-3,4-dihydrocarbostyril
(Zinc chloride-sodium chloride method)

One hundred and forty grams of 3,5-dimethoxy-N-(β-bromopropionyl) aniline were added rapidly to a mixture, previously dried at 155°C. for 2.5 hours, consisting of 70 g. of zinc chloride and 140 g. of sodium chloride at a temperature of about 155°C. The reaction mixture was maintained at a temperature of about 155°C. for 20 minutes, cooled to room temperature, and 5,7-dimethoxy-3,4-dihydrocarbostyril formed in the above reaction was extracted therefrom with 500 ml. of ethyl acetate. The extract was washed successively with 400 ml. of 3 N hydrochloric acid, water, a saturated solution of sodium bicarbonate, and a saturated solution of sodium chloride. The extract was separated and dried and the solvent evaporated therefrom in vacuo. The resulting residue yielded 16.9 g. of 5,7-dimethoxy-3,4-dihydrocarbostyril melting at about 192°–194°C. after recrystallization from methanol. The mother liquor was evaporated in vacuo to yield 100 g. of an oil consisting of partially demethylated product. The oil was treated with a mixture of 300 ml. of methyl iodide and 240 g. of potassium carbonate in 1-liter of acetone at reflux temperature for 72 hours. The reaction mixture was cooled, filtered, and the solvent evaporated in vacuo. An additional 11.7 g. of 5,7-dimethoxy-3,4-dihydrocarbostyril melting at about 195°–196°C. after recrystallization from methanol were obtained from the residue.

Analysis--Calculated: C, 63.75; H, 6.32; N, 6.76
Found: C, 63.83; H, 6.64; N, 6.76

EXAMPLE 3

1-(2-Carboxyphenyl)-5,7-dimethoxy-3,4-dihydrocarbostyril

Eight grams of 5,7-dimethoxy-3,4-dihydrocarbostyril and 19.8 g. of 2-iodobenzoic acid were reacted together in the presence of 0.5 g. of cupious iodide, 0.2 g. of cupric acetate monohydrate, 16 g. of potassium carbonate and 175 ml. of nitrobenzene. The reaction mixture was maintained at a temperature of about 150°C. for 24 hours with continual stirring, and was then steam distilled to remove the nitrobenzene. The aqueous mixture was filtered and acidified. 1-(2-Carboxyphenyl)-5,7-dimethoxy-3,4-dihydrocarbostyril, formed in the above reaction, was extracted therefrom with 400 ml. of ethyl acetate. The organic extract was washed with a saturated solution of sodium chloride which was discarded. The carbostyril was extracted from the organic layer with a saturated aqueous solution of sodium bicarbonate. The sodium bicarbonate extract was acidified and the product re-extracted with ethyl acetate. The ethyl acetate extract was dried, and the ethyl acetate removed therefrom by evaporation in vacuo. Three grams of 1-(2-carboxyphenyl)-5,7-dimethoxy-3,4-dihydrocarbostyril were obtained from the resulting residue melting at about 223°–225°C. after recrystallization from methyl alcohol.

Analysis--Calculated: C, 66.05; H, 5.24; N, 4.28
Found: C, 65.83; H, 5.37; N, 4.22

EXAMPLE 4

Methyl 3-(1,3-dimethoxy-9-oxo-4-acridanyl)-propionate

Four grams of 1-(2-carboxyphenyl)-5,7-dimethoxy-3,4-dihydrocarbostyril prepared as in Example 3, and 160 ml. of polyphosphoric acid were mixed together and the mixture heated at about 100°C. for 1.5 hours. The reaction mixture was poured over 400 g. of crushed ice, yielding a solid precipitate which was filtered and dried by azeotropic distillation. The dried precipitate was dissolved in 100 ml. of 1 N methanolic hydrogen chloride and the solution refluxed for 2.5 hours. The solvent was removed therefrom by evaporation in vacuo to yield 3.7 g. of a residue consisting essentially of methyl 3-(1,3-dimethoxy-9-oxo-4-acridanyl)-propionate. Suspension of the residue in 400 ml. of a saturated sodium bicarbonate solution, followed by separation and recrystallization of the thus obtained product, gave purified methyl 3-(1,3-dimethoxy-9-oxo-4-acridanyl)-propionate melting at about 244°–245°C.

Analysis--Calculated: C, 66.85; H, 5.61; N, 4.10
Found: C, 66.81; H, 5.64; N, 4.07

EXAMPLE 5

Methyl 3-(1-hydroxy-3-methoxy-9-oxo-4-acridanyl)-propionate

Four grams of methyl 3-(1,3-dimethoxy-9-oxo-4-acridanyl)-propionate, prepared as in Example 4, were dissolved in 300 ml. of methylene chloride and the solution treated with an excess of gaseous boron trichloride at a temperature of 5°C. The reaction mixture was then allowed to remain at room temperature for 30 minutes after which time 300 ml. of water were added. The methylene chloride layer containing methyl 3-(1-hydroxy-3-methoxy-9-oxo-4-acridanyl)-propionate formed in the above reaction was separated and washed successively with 300 ml. water, 300 ml. of a saturated solution of sodium chloride. The washed methylene chloride layer was dried and the solvent evaporated therefrom yielding as a residue 3 g. of methyl 3-(1-hydroxy-3-methoxy-9-oxo-4-acridanyl)-propionate melting at about 194°–195°C. after recrystallization from a chloroform-ethyl alcohol solvent mixture.

Analysis--Calculated: C, 66.05; H, 5.24; N, 4.28
Found: C, 65.91; H, 5.67; N, 3.94

EXAMPLE 6

Methyl 3-(1-hydroxy-3-methoxy-9-oxo-4-acridanyl)-propionate
(Grignard method)

To an ethereal solution of methylmagnesium iodide prepared in the usual manner from 200 mg. of magnesium and 0.3 ml. of methyl iodide, 10 ml. of dry pyridine were carefully added followed by 170 mg. of methyl 3-(1,3-dimethoxy-9-oxo-4-acridanyl) propionate dissolved in 15 ml. of pyridine. The reaction mixture was heated at a temperature of about 50°C. to about 60°C.

for 20 hours and then poured over an ice-water mixture. The methyl 3-(1-hydroxy-3-methoxy-9-oxo-4-acridanyl)-propionate formed in the above reaction was extracted into chloroform, and the extract separated and washed with a saturated solution of ammonium chloride. The organic layer was then dried and the solvent evaporated therefrom in vacuo. 144.2 Milligrams of methyl 3-(1-hydroxy-3-methoxy-9-oxo-4-acridanyl)-propionate were obtained, melting at about 194°–195°C. after recrystallization from aqueous methanol.

EXAMPLE 7

1-Hydroxy-4-(3-hydroxy-3-methylbutyl)-3-methoxy-9-acridanone

Six hundred fifty milligrams of methyl 3-(1-hydroxy-3-methoxy-9-oxo-4-acridanyl)-propionate, prepared as in Example 5, were dissolved in 50 ml. of tetrahydrofuran and reacted with 10 ml. of a 1.7 molar solution of methyllithium in diethyl ether at a temperature of −19° C. The above reaction was carried out under nitrogen with continual stirring. After about 30 minutes, the reaction mixture was decomposed with 100 ml. of 3 N hydrochloric acid and the 1-hydroxy-4-(3-hydroxy-3-methylbutyl)-3-methoxy-9-acridanone formed in the above reaction was extracted therefrom with 200 ml. of ethyl acetate. The extract was washed successively with 200 ml. of a saturated solution of sodium chloride, 200 ml. of a saturated solution of sodium carbonate and again with a saturated solution of sodium chloride. The extract was dried and the solvent evaporated therefrom. Six hundred and eighty-three milligrams of 1-hydroxy-4-(3-hydroxy-3-methyl-butyl)-3-methoxy-9-oxoacridanone were obtained, melting at about 213°–214° C. after recrystallization from ethyl acetate.

Analysis--Calculated: C, 69.70; H, 6.47; N, 4.28
Found: C, 69.41; H, 6.44; N, 4.27

EXAMPLE 8

6-Hydroxy-3,3-dimethyl-2,3-dihydro-7(12H)-1H-pyrano[2,3-c]-acridinone

Nine hundred eighty-five milligrams of 1-hydroxy-4-(3-hydroxy-3-methylbutyl)-3-methoxy-9-acridanone, prepared as in Example 7, were heated with 25 g. of pyridine hydrochloride at a temperature of 190° to 195°C. for 3 hours. The product of the reaction, 6-hydroxy-3,3-dimethyl-2,3-dihydro-7(12H)-1H-pyrano[2,3-c]acridinone, crystallized from the reaction mixture on the addition of 200 ml. of water and was collected by filtration. The compound was purified by chromatography, using a 5:1 benzene-ethyl acetate eluant over a column packed with 60 g. of silica gel. Thirty-five fractions of 22 ml. each were collected at a flow rate of 88 ml. per hour. Fractions 15 to 29 were combined and evaporated in vacuo, and the solid residue recrystallized from a chloroform-ethanol solvent mixture to yield 84 mg. of purified 6-hydroxy-3,3-dimethyl-2,3-dihydro-7(12H)-1H-pyrano[2,3-c]acridinone melting at about 273°–274° C.

Analysis--Calculated: C, 73.20; H, 5.80; N, 4.74
Found: C, 73.38; H, 5.65; N, 4.56

EXAMPLE 9

Nordihydroacronycine

Forty-seven milligrams of 6-hydroxy-3,3-dimethyl-2,3-dihydro-7(12H)-1H-pyrano[2,3-c] acridinone, prepared as in Example 8, were dissolved in 50 ml. of acetone and reacted with 5 ml. of methyl iodide at reflux temperature for 5 hours in the presence of 4 g. of potassium carbonate. The reaction mixture was filtered and then diluted with 100 ml. of water. The acetone was removed by evaporation and nordihydroacronycine, formed in the above reaction, was extracted from the aqueous layer with 100 ml. of ethyl acetate. The extract was washed with 100 ml. of a saturated solution of sodium chloride, dried, and the ethyl acetate removed therefrom by evaporation in vacuo. 19.7 Milligrams of nordihydroacronycine were obtained, melting at about 205°–212°C. after recrystallization from chloroform-ethanol.

Analysis--Calculated: C, 73.77; H, 6.19; N, 4.53
Found: C, 73.61; H, 6.11; N, 4.53

EXAMPLE 10

Noracronycine 309.4 Milligrams of nordihydroacronycine, prepared as in Example 9, and 249.7 mg. of 2,3-dichloro-5,5-dicyanoquinone were reacted in 125 ml. of toluene at reflux temperature for 1.5 hours. The reaction mixture was cooled to room temperature, and diluted with 125 ml. of ethyl acetate. The diluted reaction mixture, after being washed successively with 250 ml. of a 5 percent solution of sodium hydroxide and with 250 ml. of a saturated solution of sodium chloride, was dried and the solvent evaporated in vacuo to yield 300 mg. of a solid residue containing noracronycine. The noracronycine was purified by chromatography using a 30:1 benzene-ethyl acetate eluant, over a column packed with 200 g. of silica gel. One hundered and forty fractions were collected of 15 ml. each. Fractions 84 to 103 were combined and evaporated in vacuo to yield 144 mg. of noracronycine melting at about 200° to 200.5°C. after recrystallization from ethyl acetate.

EXAMPLE 11

6-Hydroxy-3,3-diethyl-10-nitro-2,3-dihydro-7(12H)-1H-pyrano[2,3-c]-acridinone

Following the procedure of Example 1, 3,5-di-n-propoxy-n-β-chloropropionylaniline can be fused in the presence of stannous chloride and sodium chloride to yield 5,7-di-n-propoxy-3,4-dihydrocarbostyril. Reaction of this compound with 4-nitro-2-iodobenzoic acid under Ullmann conditions yields 1-(2-carboxy-5-nitrophenyl)-5,7-di-n-propoxy-3,4-dihydrocarbostyril. Treatment of this latter compound with polyphosphoric acid followed by esterification of the resulting product with ethanolic hydrogen chloride gives ethyl 3-(1,3-di-n-propoxy-6-nitro-9-oxo-4-acridanyl)-propionate, selective de-etherification of which yields the corresponding 1-hydroxy derivative. Reaction of this latter compound with ethyllithium gives 1-hydroxy-4-(3-hydroxy-3-ethylpentyl)-3-n-propoxy-6-nitro-9-acridanone treatment of which with pyridine hydrogen chloride yields 6-hydroxy-3,3-diethyl-10-nitro-2,3-dihydro-7(12H)-1H-pyrano[2,3-c]acridinone.

Following the same procedure, but using an appropriately substituted o-halobenzoic acid and the proper alkylating agent, either alkyl lithium or Grignard reagent, the following compounds can be prepared:

6-hydroxy-3,3-di-n-propyl-10-chloro-2,3-dihydro-7(

12H)-1H-pyrano[2,3-c]acridinone
  6-hydroxy-3,3-di-isobutyl-8-methyl-2,3-dihydro-7(12H)-1H-pyrano[2,3-c]acridinone
  6-hydroxy-3,3-di-n-butyl-8-trifluoromethyl-2,3-dihydro-7(12H)-1H-pyrano[2,3-c]acridinone
  6-hydroxy-3,3-di-ethyl-9-ethoxy-2,3-dihydro-7(12H)-1H-pyrano[2,3-c]acridinone
I claim:
1. The compound of the formula
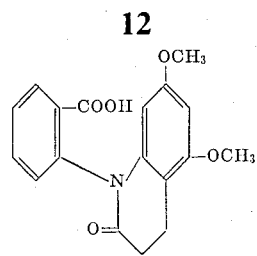
* * * * *

UNITED STATES PATENT OFFICE
CERTIFICATE OF CORRECTION

Patent No. 3,728,350    Dated April 17, 1973

Inventor(s) James R. Beck

It is certified that error appears in the above-identified patent and that said Letters Patent are hereby corrected as shown below:

In the 4th line of the title on the cover page, "ACRONYCIS" should read --ACRONYCINE--.

In column 1, line 3, "ACRONYCIS" should read --ACRONYCINE--.

In column 1, line 16, "(1949)]1966" should read --(1949)]. In 1966--.

In column 1, line 18, "Covindachari" should read --Govindachari--.

In column 1, line 21, "OOCH₃" should be deleted.

In column 1, line 37, "J. Scl. Res." should read --J. Sci. Res.--.

In column 3, that portion of the structural formula on the lower left depicted as follows:

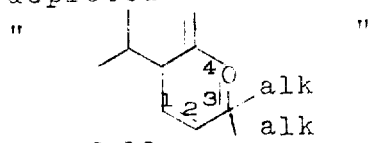

should be drawn as follows:

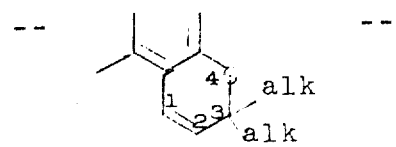

In column 3, line 42, the colon after "like" should be replaced with a semicolon.

In column 5, line 4, "methanolysisesterification" should read as two words as follows: --methanolysis esterification--.

Certificate of Correction
Page Two
Patent No. 3,728,350

In column 6, line 27, "Borwn" should read --Brown--.

In column 10, line 68, "-7(" should read -- -7- --.

In column 11, lines 1, 3, and 7, "12H" should read --(12H)--.

In column 11, lines 2 and 6, "-7(" should read -- -7- --.

Signed and sealed this 17th day of September 1974.

(SEAL)
Attest:

McCOY M. GIBSON JR.
Attesting Officer

C. MARSHALL DNN
Commissioner of Patents